United States Patent
Walecka et al.

(10) Patent No.: US 12,212,257 B2
(45) Date of Patent: Jan. 28, 2025

(54) PERMANENT MAGNET SYNCHRONOUS MOTOR (PMSM) INTEGRATED POSITION SENSING

(71) Applicant: Raytheon Company, Arlington, VA (US)

(72) Inventors: Andrew Christopher Walecka, Tucson, AZ (US); Gary Joseph Sutton, Oro Valley, AZ (US)

(73) Assignee: Raytheon Company, Arlington, VA (US)

( * ) Notice: Subject to any disclaimer, the term of this patent is extended or adjusted under 35 U.S.C. 154(b) by 42 days.

(21) Appl. No.: 18/118,968

(22) Filed: Mar. 8, 2023

(65) Prior Publication Data

US 2024/0305230 A1 Sep. 12, 2024

(51) Int. Cl.
*H02K 7/02* (2006.01)
*G01B 7/30* (2006.01)
(Continued)

(52) U.S. Cl.
CPC ............... *H02P 21/18* (2016.02); *G01B 7/30* (2013.01); *G01D 5/14* (2013.01); *H02P 21/13* (2013.01); *H02P 2207/055* (2013.01)

(58) Field of Classification Search
CPC .... H02P 21/18; H02P 21/13; H02P 2207/055; G01B 7/30; G01D 5/14
See application file for complete search history.

(56) References Cited

U.S. PATENT DOCUMENTS 6,215,299 B1   4/2001   Reynolds et al.
6,522,130 B1   2/2003   Lutz
(Continued)

FOREIGN PATENT DOCUMENTS

CN   208904843   5/2019
JP   6265824    1/2018
(Continued)

OTHER PUBLICATIONS

"#05 Principle and advantages of magnetic encoder", Retrieved online. URL: <https://www.akm.com/US/en/products/rotation-angle-sensor/tutorial/magnetic-encoder/>, 10 pgs.
(Continued)

*Primary Examiner* — Muhammad S Islam
(74) *Attorney, Agent, or Firm* — Schwegman Lundberg & Woessner, P.A.

(57) ABSTRACT

A Permanent Magnet Synchronous Motor (PMSM) includes a hollow cylindrical stator with stator windings and a magnetic rotor having M pole pairs arranged to rotate around a rotational axis in the stator by a rotor shaft. The stator windings are energized to generate a magnetic rotational field in dependence upon the rotational position of the magnetic rotor. Two or more analog magnetic flux sensors are positioned within the hollow cylindrical stator and arranged concentrically with respect to the rotational axis around the stator at a constant mechanical angle equal to a constant electrical angle divided by M relative to each other. The magnetic flux sensors are spaced directly from the magnetic rotor by a radial gap (X) in such a way that the magnetic flux of the magnetic rotor impinges on the analog magnetic flux sensors without obstruction to output two or more sinusoidal signals with phases separated by the constant electrical angle that can be evaluated to determine the rotational position of the magnetic rotor. Sensor integration eliminates the additional sense magnet, Hall sensors and CCA positioned external to the motor housing to provide a smaller motor package at lower cost. Integration also facilitates the use of the PMSM in high-temperature or high-shock (high g) environments such as gun-launched guided projectiles or hypersonic missiles.

20 Claims, 13 Drawing Sheets

(51) Int. Cl.
  *G01D 5/14* (2006.01)
  *H02P 21/13* (2006.01)
  *H02P 21/18* (2016.01)

(56) References Cited

U.S. PATENT DOCUMENTS

| | | |
|---|---|---|
| 7,250,754 B2 | 7/2007 | Godkin |
| 8,896,163 B2 | 11/2014 | Wallner |
| 2003/0128026 A1 | 7/2003 | Lutz |
| 2015/0288271 A1* | 10/2015 | Kuznetsov .............. H02P 25/22 310/55 |
| 2019/0157929 A1 | 5/2019 | Cho et al. |
| 2022/0167310 A1 | 5/2022 | Wang et al. |

FOREIGN PATENT DOCUMENTS

| | | |
|---|---|---|
| JP | 2018537942 | 12/2018 |
| KR | 20160011920 | 2/2016 |
| WO | WO-0004339 A1 | 1/2000 |
| WO | 2024186461 | 9/2024 |

OTHER PUBLICATIONS

"Analog Hall Sensors", Faulhaber Product Application Note 162, (Sep. 4, 2021), 14 pgs.
Lara, Andrzej, "Using the Resolver Interface eTPU Function", Freescale Semiconductor, Document No. AN3943, (2009), 28 pgs.
"International Application Serial No. PCT US2024 016239, International Search Report mailed Jun. 27, 2024", 5 pgs.
"International Application Serial No. PCT US2024 016239, Written Opinion mailed Jun. 27, 2024", 9 pgs.

\* cited by examiner

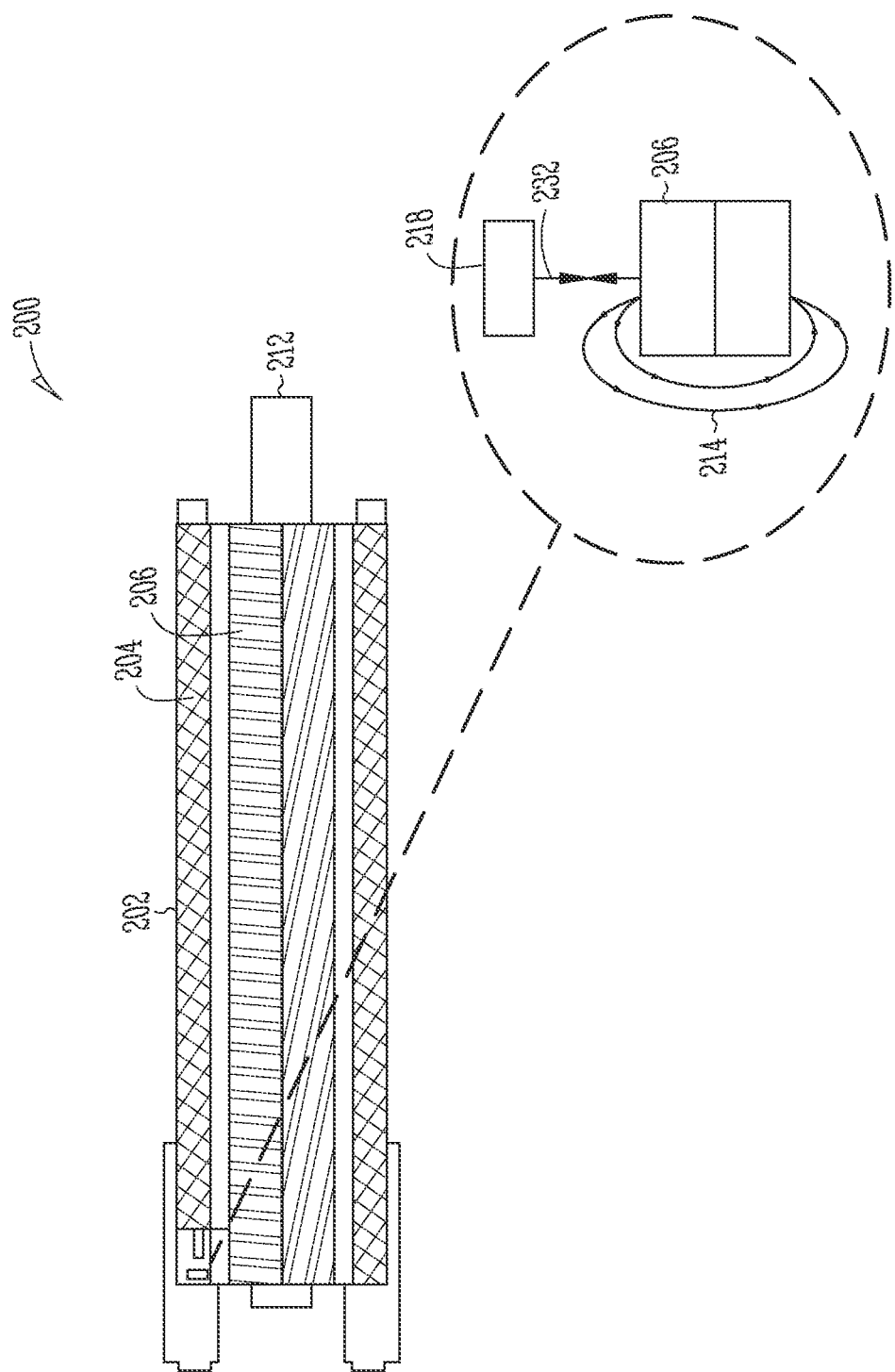

PERMANENT MAGNET SYNCHRONOUS MOTOR (PMSM) INTEGRATED POSITION SENSING

BACKGROUND

Field

This disclosure relates to electric motors and specifically permanent magnetic synchronous motors (PMSMs) and, more particularly, to measurement of motor position to feed a servo-control algorithm to generate the multi-phase waveforms to move the motor and generate torque.

Description of the Related Art

Electric motors that require controlled armature current waveforms (in order to rotate smoothly, for example) also require accurate rotor position sensing. Some motors use sensorless technologies, but these technologies do not provide accurate rotor position sensing at very low speeds and are not smooth upon startup of the motor. Other motors inherently cannot use sensorless technologies and must incorporate a rotor position sensing mechanism. Some motors use either an encoder or a resolver together with associated electronic circuitry to determine rotor positions. Depending on the resolution required, however, these solutions can become prohibitively expensive within applications that require low-cost motors.

In particular, many electric motor applications require smooth rotation and/or accurate control. Brushless motors including permanent magnetic synchronous motors (PMSMs) and ones that do not use permanent magnets such as switched reluctance typically achieve this by using 3-phase sine-wave commutation and accurate rotor position detectors, usually in the form of an encoder or a resolver. The accurate rotor position detector ensures that the sine wave remains synchronized with the rotor, thus avoiding commutation-induced torque ripple. Methods presently used in the industry for accurately detecting rotor positions use encoders and resolvers and have been known and employed in motor drives for many years.

Ring magnets and digital Hall effect sensors are often used as a rotor position sensing mechanism within brushless direct current (DC) motor applications where square-wave or six-step drive is used. This method of sensing provides low resolution, typically six position steps per electrical cycle when using three sensors. Six-step drive does not require high resolution rotor position sensing, however, so this is acceptable. At the same time, these drive methods do not result in ripple-free torque from the motor either. This may be unacceptable in a variety of applications.

U.S. Pat. No. 6,552,130 entitled "Accurate Rotor Position Sensor and Method Using Magnet and Sensors Mounted Adjacent to the Magnet and Motor" includes a sense ring magnet and two analog Hall effect sensors. The sense ring is magnetized in an alternating north-south fashion with a number of poles that correspond to a number of motor field poles. The Hall effect sensors are placed so that they measure magnetic flux tangential to the sense ring. As shown in FIG. 7 of the '130 patent, a sense ring 200 is affixed to shaft 712 and rotates with the rotor 724 about an axis 714. A Hall effect sensor 722 is positioned near the sense ring 200. The Hall effect sensors are preferably located at a distance from the sense ring where the Hall effect sensor output waveforms are substantially triangular, with a highly linear portion centered at zero flux between the minimum and maximum waveform peaks. The linear portions of the waveforms are decoded using an A/D converter and control software to provide an accurate measure of the rotor position.

U.S. Patent Pub. No. 2002/0167310 entitled "Angle Transmitter" discloses an angular transmitter integrated with a small electrical motor and supplying phase-shifted signals has at least one magnetic part having an end face and alternatingly arranged poles on the end face. At least one sensor is arranged opposed to the at least one magnetic part. The at least one sensor has at least two sensor elements arranged angularly relative to one another. The at least two sensor elements are rotated relative to one another by 90° or by 60°. The at least two sensor elements cross one another.

As shown in FIGS. 1A-1C herein, the current state-of-the-art used with PMSMs is very similar to the sense configuration in the '130 patent, which itself is not practical due to the incorporation of the sense magnet and Hall sensors inside the motor greatly increasing the overall size of the motor assembly. In practice, a permanent magnet 100 (single pole pair) is mounted on the end of a motor shaft 102 external to the motor housing 104 of a PMSM 106. A Hall sensor chip 108 including a pair of analog hall sensors is mounted on a card carrying assembly (CCA) 110 adjacent permanent magnet 100 and placed so that they measure magnetic flux tangential to permanent magnet 100. The Hall sensors are separated by an electrical angle=magnetic angle=90° relative to each other. The stator windings are energized by 3-phase waveforms to generate a magnetic rotation field inside motor housing 104 that rotates motor shaft 102 and permanent magnet 100, which in turn creates a rotational magnetic (B) field 112. The pair of Hall sensors are placed so that they measure magnetic flux from B field 112 tangential to the dipole magnet 100.

As described in Section 502 Principle of Magnetic Encoder, "Principle and Advantages of Magnetic Encoder" Asahi Kasei Microdevices access Feb. 3, 2023, when the motor shaft 102 rotates, the magnetic field 112 created by the permanent magnet 100 attached to the tip of the shaft also rotates. At this time, the magnetic field rotates with constant strength in the area near the center of the rotation axis. The Hall element detects this change of magnetic field distribution and converts it into an electrical signal. The Hall element is a magnetic sensor that can only detect the strength of a magnetic field in a single direction. Therefore, in order to detect the rotational position of the XY rotation plane, a Hall element for detecting the strength of the X axis component (Bx) 114 and a Hall element for detecting the strength of the Y axis component (By) 116 are required.

The magnetic field information of the X-axis component and Y-axis component converted into an electric signal by the hall element is converted into a digital signal by the AD converter. Furthermore, it is sent to an arithmetic circuit and converted into angle information using a trigonometric function. A plane figure obtained by synthesizing the X-axis component and the Y-axis component orthogonal to each other is called a Lissajous figure (or Lissajous waveform). Under the Shaft-End configuration without misalignment, the strength of the rotating magnetic field does not change, so the Lissajous figure draws a perfect circle 118. Therefore, the angle output result converted by the trigonometric function has zero error. In addition, even if the Hall element that detects the strength of the horizontal magnetic field is misaligned, the magnetic field input to the Hall element does not change much, so the angular error included in the calculation result is small. When the X-axis component is Bx and the Y-axis component is By, the rotation angle θ 120 can be obtained as an absolute angle by calculating arctan (By/Bx).

U.S. Pat. No. 8,896,163 entitled "Electric Micromotor" discloses a miniature electric motor (1) with an outer diameter ($D_A$) that is smaller than or equal to 6 mm, has a hollow cylindrical stator (2) with stator coils (8) and a magnetic rotor (4) rotatably arranged around a rotational axis (16) in the stator (2) by means of a rotor shaft (10). The stator coils (8) can be energized in order to generate a magnetic rotational field in dependence upon the rotational position of the magnetic rotor (4). A sensor chip (20) having at least one magnetic field sensor (22) is arranged in such a manner in an area axially adjacent to a front face of the magnetic rotor (4) located within a plane that is vertical to the rotational axis (16) that the magnetic field sensor (22) is impinged in such a way by the magnetic field that the rotational position of the rotor can be evaluated. As best shown in FIG. 1, sensor chip (20) is spaced via an axial gap (A) from an adjacent front face of the magnetic rotor (4). As best shown in FIG. 2, sensor chip (20) is offset from rotational axis (16) and external to hollow cylindrical stator (2). Col 5, line 50 states that "it can be seen that the magnetic field of the magnetic rotor 4 passes through several components until it reaches the area of the sensor chip 20 in the preferred embodiment. Surprisingly, the magnetic field can still be detected . . . ."

As can be seen in particular in FIG. 8 of the '163 patent, the sensor chip 20 has preferably four integrated magnetic field sensors 22, which are designed especially as Hall-effect sensors. All of the magnetic field sensors 22 according to FIG. 8 are arranged in an area that covers the projection of the magnetic rotor 4 and in a specific, in particular radially symmetric peripheral distribution, over a reference circle 24 around the extended rotational axis 16, or the rotor shaft 10. The reference circle 24 has a diameter $D_T$ which is located in the area between the diameter $D_W$ of the rotor shaft 10, wherein this diameter $D_W$ corresponds to the inner diameter of the hollow cylindrical magnetic rotor 4, and the outer diameter $D_R$ of the magnetic rotor 4. In the preferred embodiment shown in FIG. 8, the reference circle 24 with its diameter $D_T$ is located within the outer half of the annular cross section of the magnetic rotor 4. Because of the preferably radially symmetric peripheral distribution of the preferably four magnetic field sensors 22, these are spaced from each other in peripheral direction at 90°, respectively. The sensor chip 20 is located inside the cross section enclosed by the return path element 6 as a result of its small design size.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides integrated position sensing for a Permanent Magnet Synchronous Motor (PMSM). Integration eliminates the additional sense magnet and positioning of Hall sensors and a CCA external to the motor housing to provide a smaller motor package at lower cost. Integration also facilitates the use of the PMSM in high-temperature or high-shock (high g) environments such as gun-launched guided projectiles or hypersonic missiles.

In an embodiment, a PMSM includes a hollow cylindrical stator with stator windings and a magnetic rotor having M pole pairs arranged to rotate around a rotational axis in the stator by a rotor shaft. The stator windings are energized to generate a magnetic rotational field in dependence upon the rotational position of the magnetic rotor. Two or more analog magnetic flux sensors (e.g., analog Hall effect sensors) are positioned within the hollow cylindrical stator and arranged concentrically with respect to the rotational axis around the stator at a constant mechanical angle equal to a constant electrical angle divided by M relative to each other. The magnetic flux sensors are spaced directly from the magnetic rotor by a radial gap (X) in such a way that the magnetic flux of the magnetic rotor impinges on the analog magnetic flux sensors without obstruction to output two or more sinusoidal signals with phases separated by the constant electrical angle that can be evaluated to determine the rotational position of the magnetic rotor.

In certain embodiments, the hollow cylindrical stator has an outer diameter greater than 20 mm to allow for integration of the analog magnetic flux sensors within the PMSM.

In general, the integrated position sensing is applicable to magnetic rotors with M=1 or more pole pairs. However, the integrated flux sensor configuration is particularly applicable to magnetic rotors having 2 or more pole pairs.

In an embodiment, the two or more analog magnetic flux sensors are positioned at one end of the hollow cylindrical stator adjacent the stator windings. The magnetic rotor is extended past the stator windings to be spaced directly across from the two or more analog magnetic flux sensors. This allows for integration of the sensors without affecting the motor design, and specifically the stator windings. The sensors are preferably positioned such that their sense axes are perpendicular to the extended magnetic rotor to align the sense axis to the rotor's magnetic field. In different implementations, the sensors may be arranged within a single plane or in different planes perpendicular to the rotational axis. The sensors may be positioned at opposite ends of the stator windings with the magnetic rotor extending past both ends of the stator windings.

In different embodiments, the sensors may be embedded in one or more pockets formed in the hollow cylindrical stator or may be surface-mounted on an interior surface of the hollow cylindrical stator.

In an embodiment, the open ends of the hollow cylindrical stator and the two or more analog magnetic flux sensors are contained within encapsulated stator windings while allowing the rotor shaft to pass through and rotate. Encapsulation allows for use in high temperature or high shock environments.

In different embodiments, the number of analog magnetic flux sensors may be 2 or 3, any more becomes redundant. The constant mechanical angle for 2 sensors is 90° electrical/M whereas the constant mechanical angle for 3 sensors is 1200 electrical/M. 3 sensors may be required or preferred due to packaging considerations. L groups of 2 or 3 sensors may be used to provide 2 or 3 average sinusoidal signals to compensate for different strengths of the rotor magnets. The L groupings of 2 or 3 sensors are spaced at a electrical angle of 360 mechanical degrees/M. L=M provides a measurement for each pole. L>M again becomes redundant.

In an embodiment, the two or three sinusoidal signals are evaluated to determine the rotational position of the magnetic sensor, which is then used as an input to determine the waveforms used to drive the stator windings to rotate the rotor shaft. A conventional four-quadrant inverse tangent function or an Angle Tracking Observer (ATO) can be used to extract a magnetic rotor mechanical angle indicative of the rotation position of the magnetic rotor from the sinusoidal signals. The ATO is a closed-loop position estimator having tunable bandwidth and damping parameters to reduce noise in the calculated magnetic rotor mechanical angle and improve accuracy of low-speed position estimation. If three signals are received, they are first subjected to a 3-phase to 2-phase transformation.

These and other features and advantages of the disclosure will be apparent to those skilled in the art from the following detailed description of preferred embodiments, taken together with the accompanying drawings, in which:

BRIEF DESCRIPTION OF THE DRAWINGS

FIGS. 2A-2C are side, sectional and end views of an embodiment of a PMSM with integrated position sensing illustrating a pair of magnetic flux sensors spaced at a constant mechanical angle of 30° for a constant electrical angle of 90° for a rotor magnet having M=3 pole pairs;

DETAILED DESCRIPTION

Figure 1A:
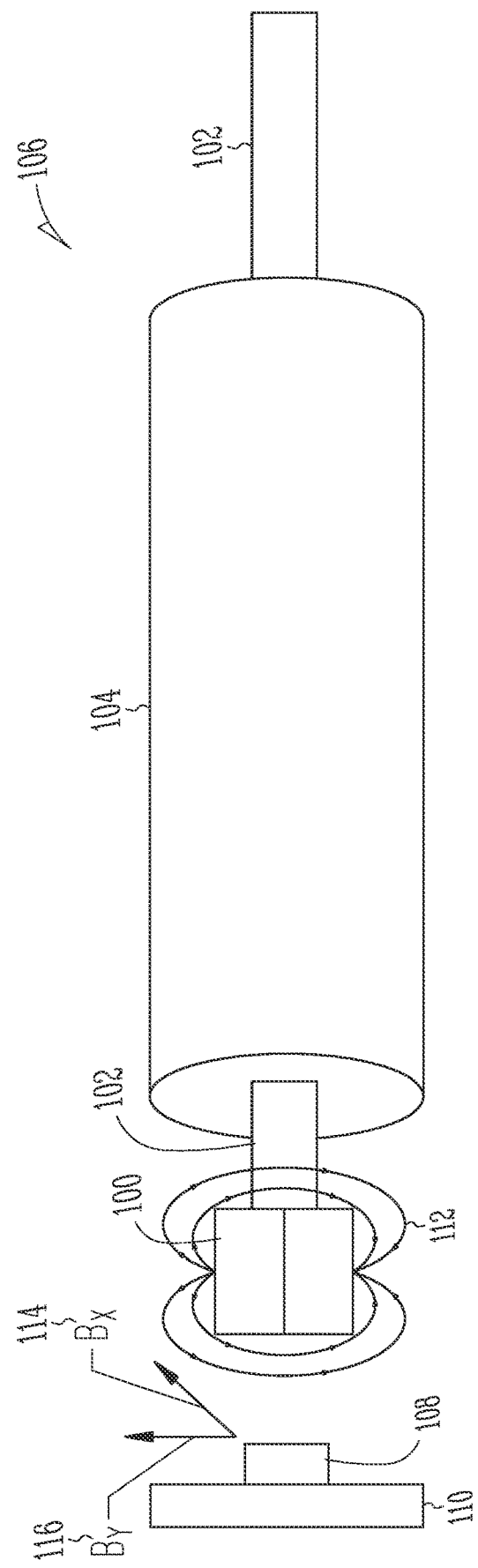
FIGS. 1A-1C, as discussed above, a PMSM provided with an external sense magnet and Hall sensor, the sensed sinusoidal signals and conventional four-quadrant inverse tangent to extract the magnetic rotor mechanical angle.

The present disclosure provides integrated position sensing for a PMSM. Integration eliminates the additional sense magnet and the Hall effect sensors and CCA positioned external to the motor housing to provide a smaller motor package at lower cost. Integration also facilitates the use of the PMSM in high-temperature or high-shock (high g) environments such as gun-launched guided projectiles or hypersonic missiles.

A PMSM includes a hollow cylindrical stator with stator windings and a magnetic rotor having M pole pairs where M is 1 or more arranged to rotate around a rotational axis in the stator by a rotor shaft. The stator windings are energized to generate a magnetic rotational field in dependence upon the rotational position of the magnetic rotor. Two or more analog magnetic flux sensors (e.g., analog Hall effect sensors) are positioned within the hollow cylindrical stator and arranged concentrically with respect to the rotational axis around the stator at a constant mechanical angle equal to a constant electrical angle divided by M relative to each other. The magnetic flux sensors are spaced directly from the magnetic rotor by a radial gap (X) in such a way that the magnetic flux of the magnetic rotor impinges on the analog magnetic flux sensors without obstruction to output two or more sinusoidal signals with phases separated by the constant electrical angle that can be evaluated to determine the rotational position of the magnetic rotor.

Referring now to FIGS. 2A-2C, 3 and 4A-4B, a two-sensor embodiment of a PMSM 200 with integrated position sensing includes a hollow cylindrical stator 202, suitably having an outer diameter of at least 20 mm, with stator windings 204 and a magnetic rotor 206 having M pole pairs 208 where M=1 or more arranged to rotate around a rotational axis 210 in the stator by a rotor shaft 212. As shown magnetic rotor 206 is a surface mount permanent magnet but could be an internal permanent magnet or consequent pole permanent magnet. The stator windings are energized to generate a magnetic rotational field 214 in dependence upon the rotational position of the magnetic rotor. Two analog magnetic flux sensors 216 and 218 (e.g., analog Hall effect sensors) are positioned within the hollow cylindrical stator and arranged concentrically with respect to the rotational axis 210 around the stator at a constant mechanical angle 219 equal to a constant electrical angle of 90° divided by M relative to each other. In this example, M=3 so the constant mechanical angle 219 is 30°. The magnetic flux sensors are spaced directly from the magnetic rotor 206 by a radial air gap 220 (X) in such a way that the magnetic flux 214 of the magnetic rotor impinges on the analog magnetic flux sensors 216 without obstruction to output two sinusoidal signals 222 and 224 with phases separated by the constant electrical angle 226 that can be evaluated to determine the rotational position $\Theta_M$ 228 of the magnetic rotor.

As shown, analog magnetic flux sensors 216 and 218 are positioned at one end of the hollow cylindrical stator 202 adjacent the stator windings 204. The sensors are embedded in one or more pockets 230 formed in the stator. If the radial air gap 220 is sufficiently large the sensors may be surface-mounted on an interior surface of the stator. The magnetic rotor 206 is extended past the stator windings 204 to be spaced directly across from the analog magnetic flux sensors. This allows for integration of the sensors without affecting the motor design, and specifically the stator windings. The sensors are preferably positioned such that their sense axes 232 are perpendicular to the extended magnetic rotor 206 to align the sense axis to the rotor's magnetic field 214. In different implementations, the sensors may be arranged within a single plane as shown here or in different planes perpendicular to the rotational axis. The sensors may be positioned at opposite ends of the stator windings 204 with the magnetic rotor extending past both ends of the stator windings. If the magnetic rotor 206 is not extended the sensors may be tilted to better align the sense axis 232 to the rotor's magnetic field 214.

The open ends of the hollow cylindrical stator 206 and the two analog magnetic flux sensors 216 and 218 are contained within an encapsulation material 234 such as an epoxy that encapsulates stator windings 204 while allowing the rotor shaft 212 to pass through and rotate. Encapsulation allows for use in high temperature or high shock environments. Absent encapsulation the motor and position sense capability is limited to approximately 250 gs. With encapsulation the motor and position sense capability are operable above 5,000 gs up to and possibly exceeding 20,000 gs.

Sinusoidal signals 222 and 224 are routed out of the PMSM 200 to an external controller (not shown) where the signals are evaluated to determine the rotational position $\Theta_M$ 228 of the magnetic sensor, which is then used as an input to determine the waveforms used to drive the stator windings to rotate the rotor shaft.

Figure 4A:
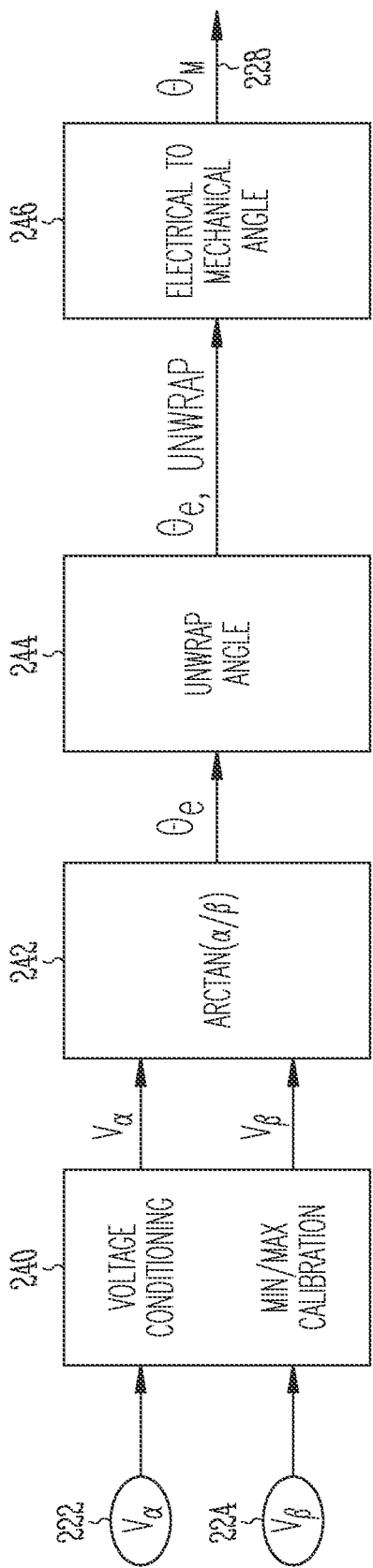
FIGS. 4A-4B are schematic illustrations of a conventional control algorithm based on a four-quadrant inverse tangent and a variant of the control algorithm using an Angle Tracking Observer (ATO), respectively, to compute the rotational position of the magnetic rotor for the pair of magnetic flux sensors.
Figure 5A:
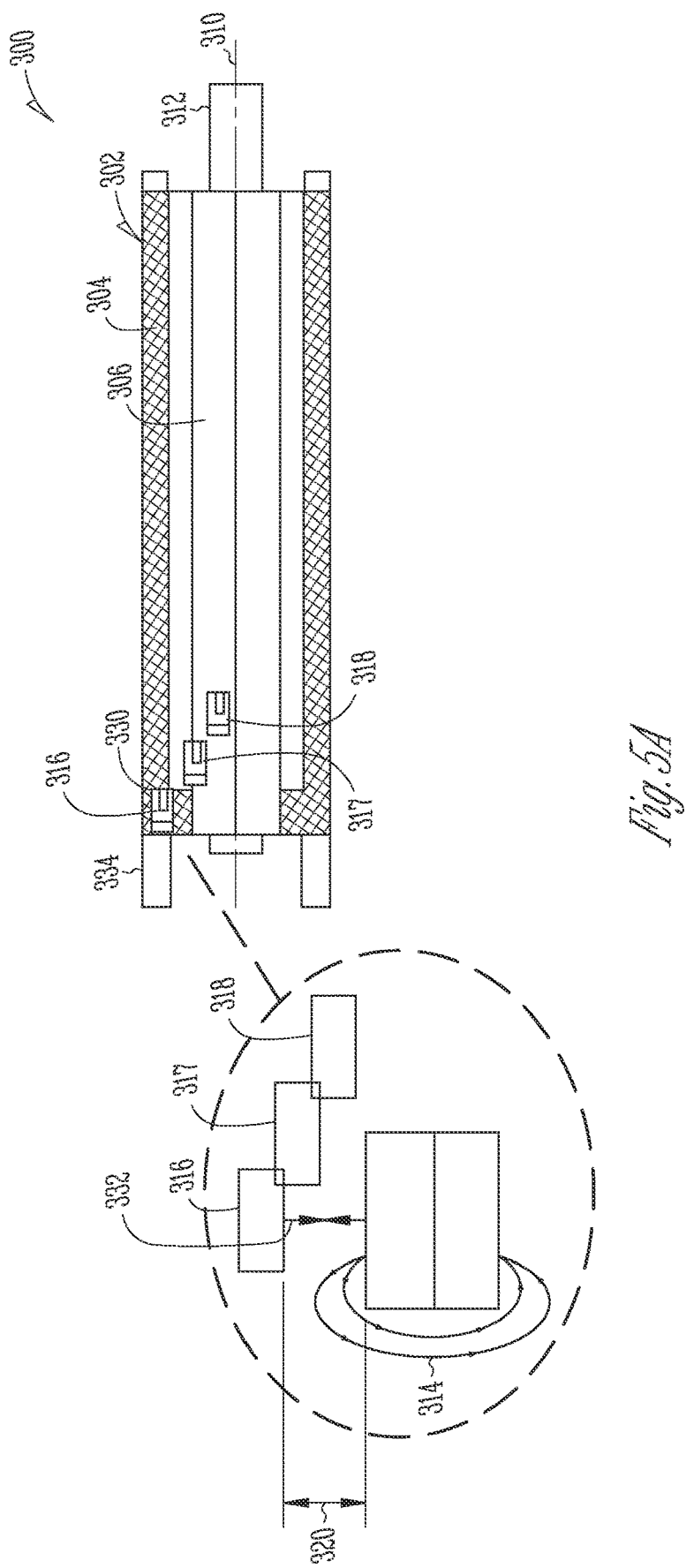
FIGS. 5A-5C are side and end view illustrating a three magnetic flux sensors spaced at a constant mechanical angle of 40° for a constant electrical angle of 120° for a rotor magnet having M=3 pole pairs.
Figure 5B:
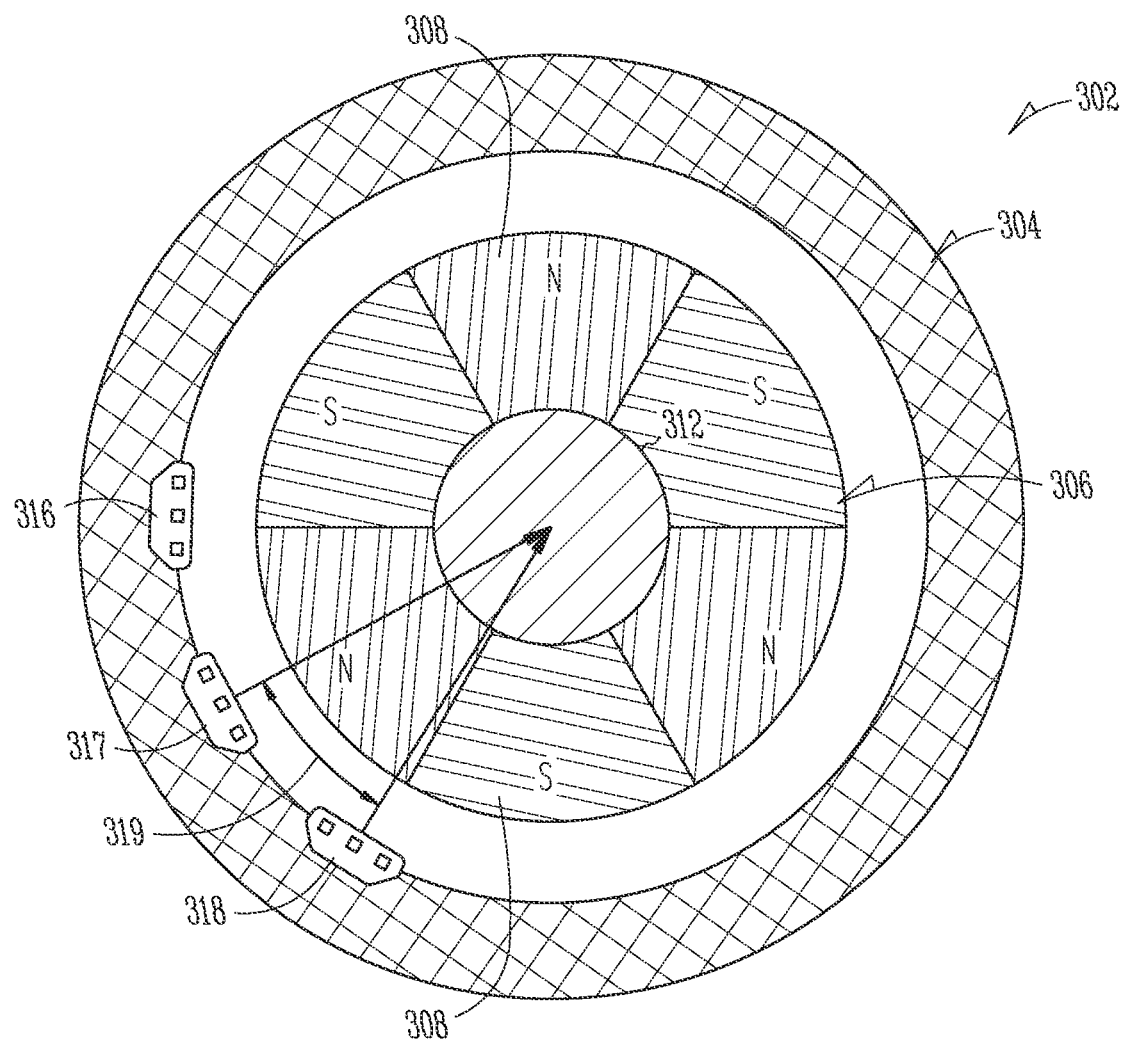
Figure 5C:
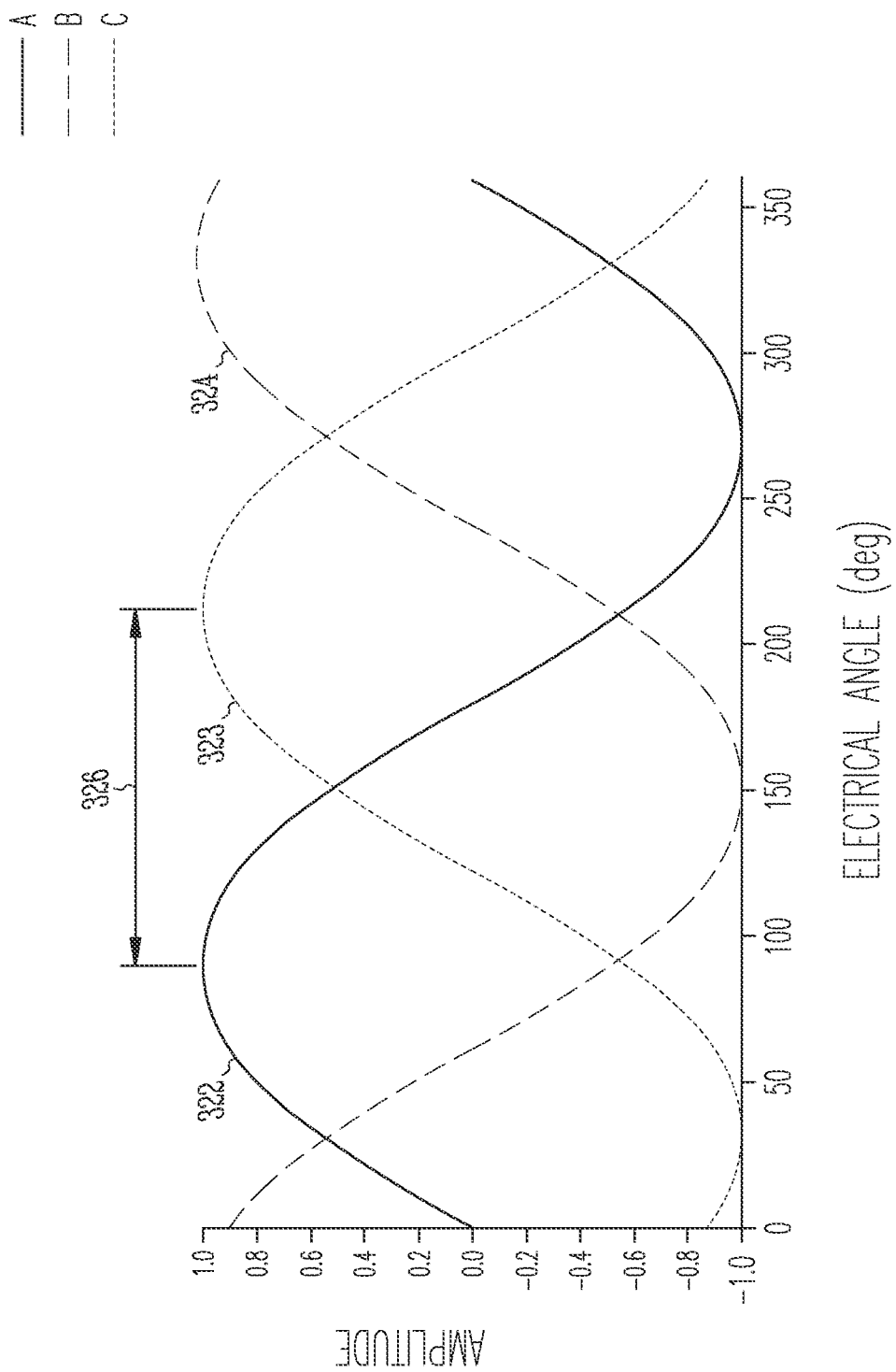

Referring now to FIG. 4A, the controller is responsive to the two sinusoidal signals 224 and 226 to condition and map the signals 240 to a specified range, compute a four-quadrant inverse tangent 242 to generate a magnetic rotor electrical angle that repeats with the number of pole pairs M, unwraps the magnetic rotor electrical angle 244 and to convert 246 the magnetic rotor electrical angle to magnetic rotor mechanical angle $\Theta_M$ 228 indicative of the rotational position of the magnetic rotor. This approach is well known and described in FIG. 5 Method B of Faulhaber Application Note 162 Analog Hall Sensors, 2021.

Figure 1C:
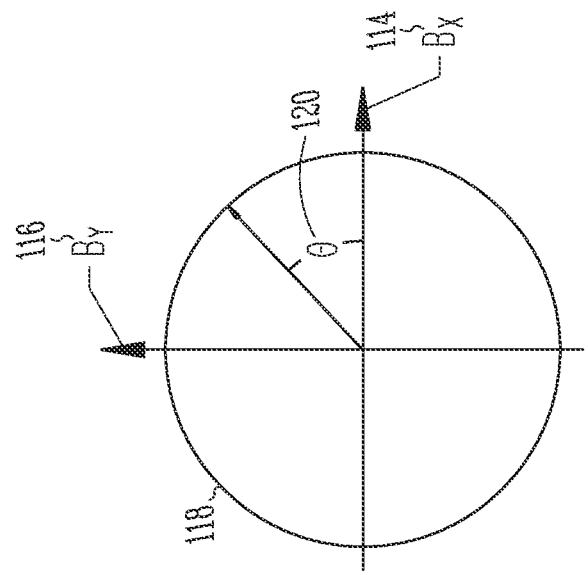
Figure 1B:
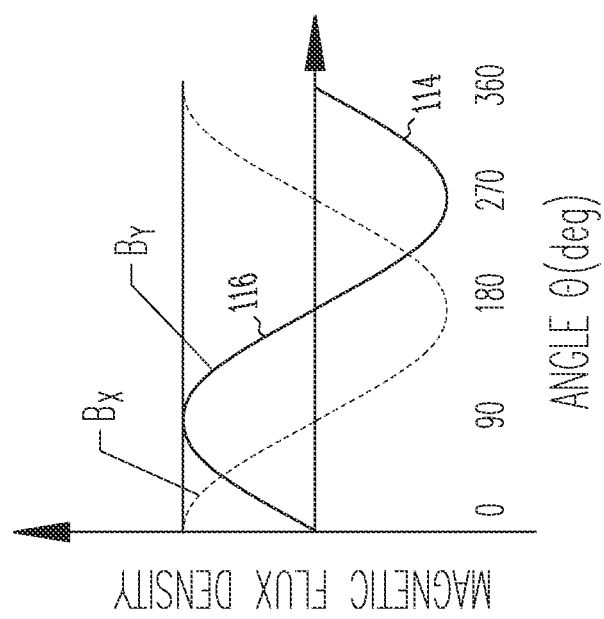
Figure 2B:
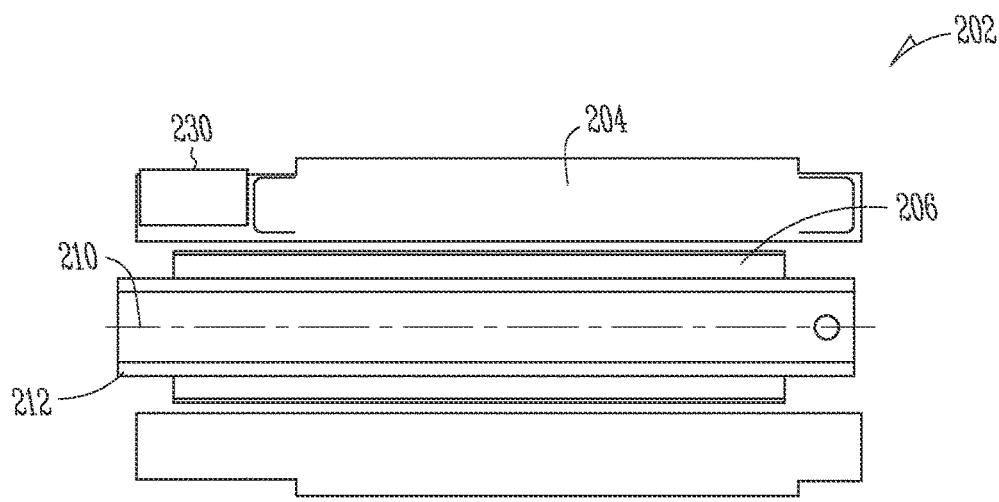
Figure 2C:
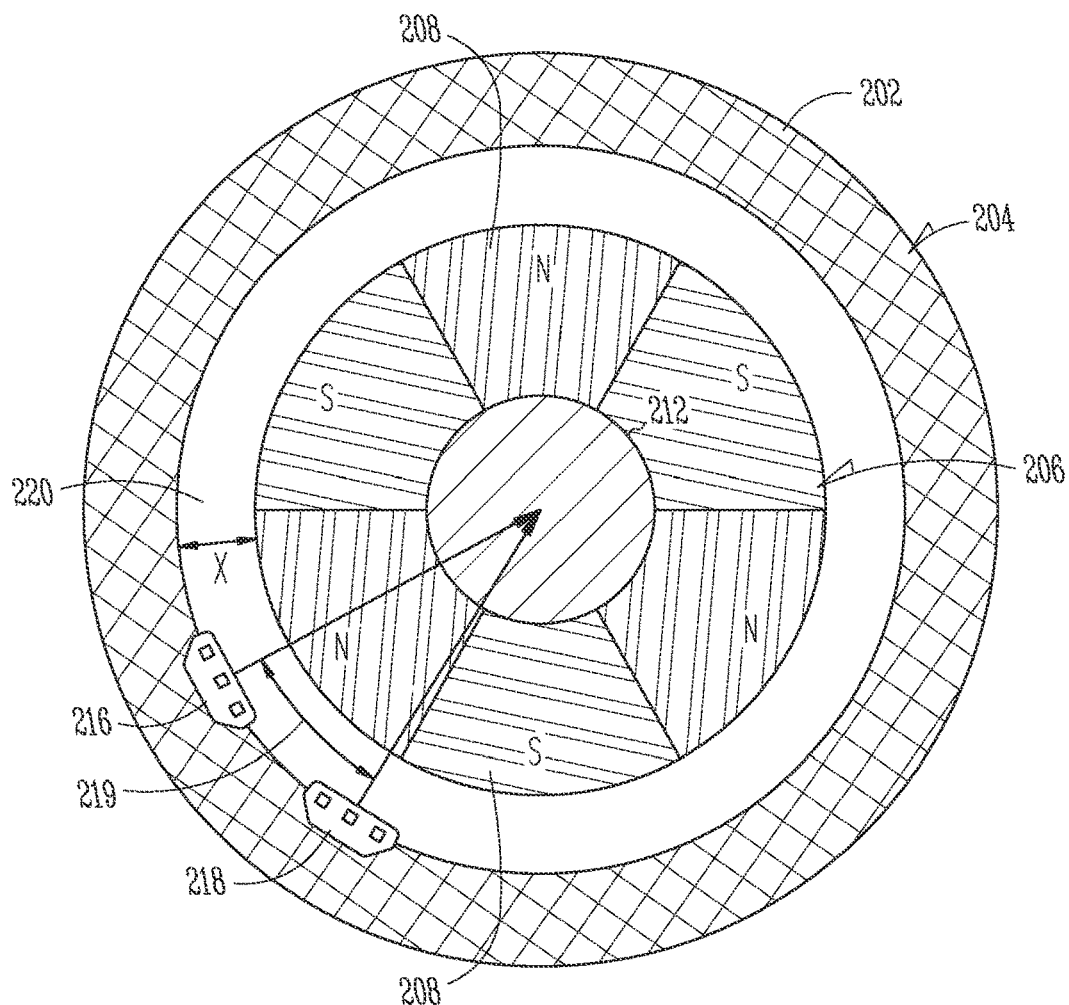
Figure 3:
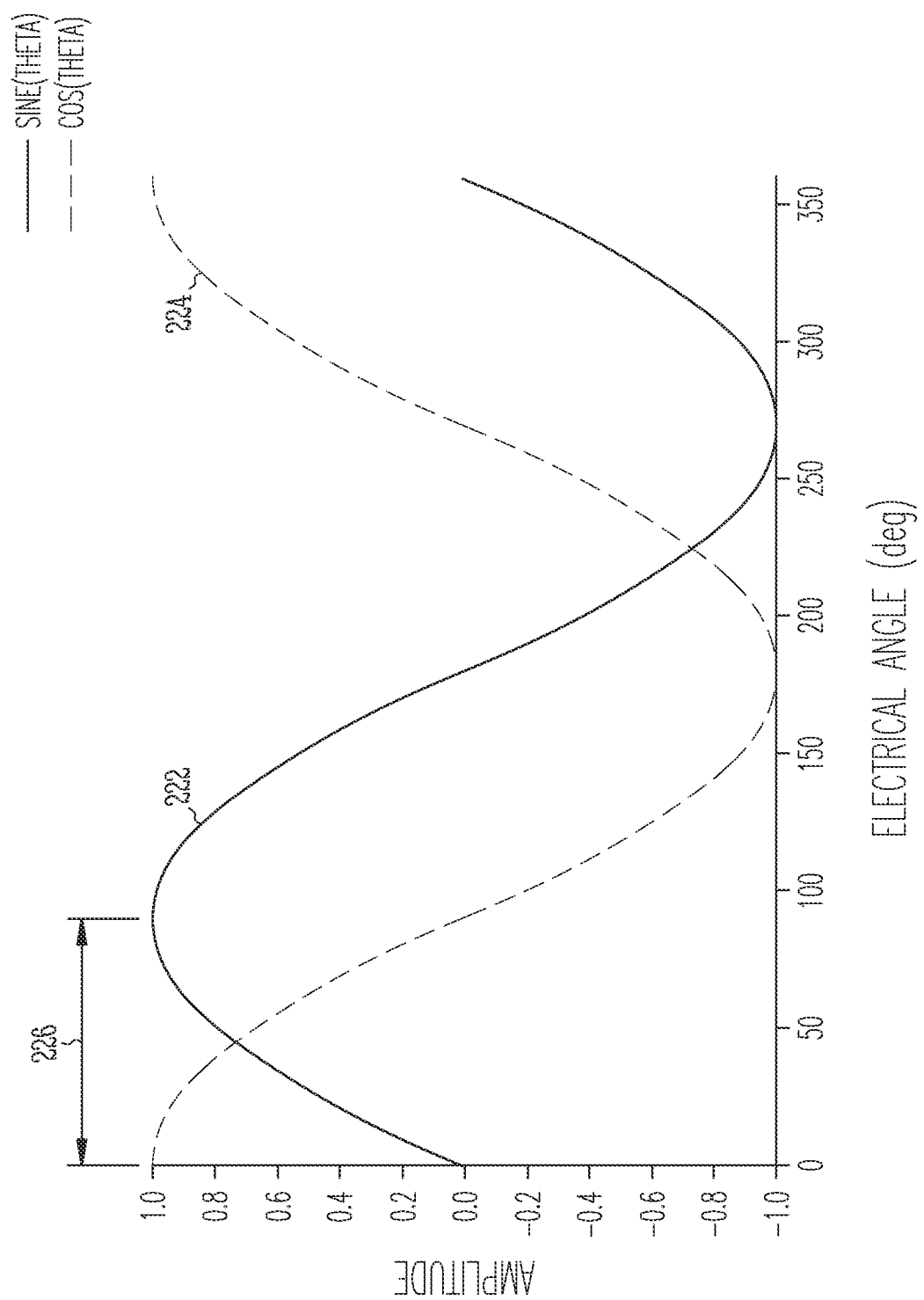
FIG. 3 is a plot of the measured sinusoidal signals separated by the constant electrical angle of 90°.
Figure 4B:
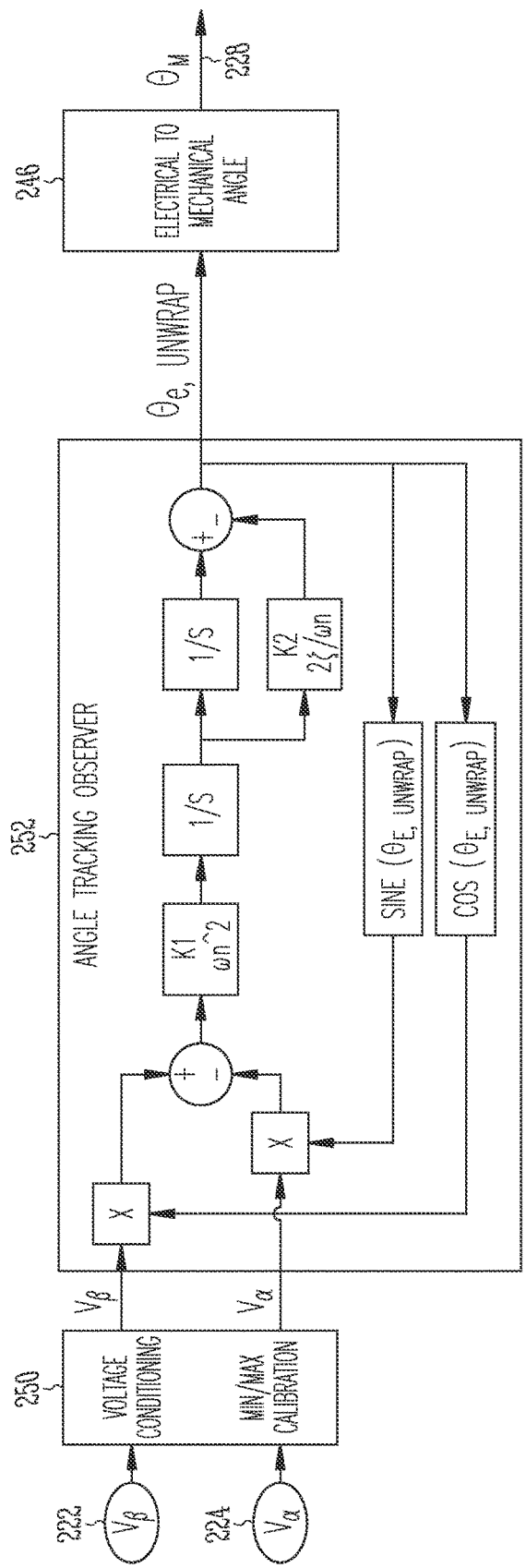

Referring now to FIG. 4B, the controller is responsive to the two sinusoidal signals 224 and 226 to condition and map the signals 250 to a specified range and to implement an Angle Tracking Observer (ATO) 252 to generate the unwrapped rotor electrical angle and to convert 246 the magnetic rotor electrical angle to the magnetic rotor mechanical angle $\Theta_M$ 228. The ATO is a closed-loop position estimator having tunable bandwidth and damping parameters to reduce noise in the calculated magnetic rotor mechanical angle and improve accuracy of low-speed position estimation. An ATO for use with a Resolver Interface is described in FIGS. 1 and 5 and Section 3.2 of Freescale Semiconductor AN3943 "Using the Resolver Interface eTPU Function" 2009. Application of the ATO to determine the rotation position of a magnetic rotor with analog magnetic flux sensors in a PMSM is new.

Referring now to FIGS. 5A-5C and 6A-6B, a three-sensor embodiment of a PMSM 300 with integrated position sensing includes a hollow cylindrical stator 302, suitably having an outer diameter of at least 20 mm, with stator windings 304 and a magnetic rotor 306 having M pole pairs 308 where M=1 or more arranged to rotate around a rotational axis 310 in the stator by a rotor shaft 312. As shown magnetic rotor 306 is a surface mount permanent magnet but could be an internal permanent magnet or consequent pole permanent magnet. The stator windings are energized to generate a magnetic rotational field 314 in dependence upon the rotational position of the magnetic rotor. Three analog magnetic flux sensors 316, 317 and 318 (e.g., analog Hall effect sensors) are positioned within the hollow cylindrical stator and arranged concentrically with respect to the rotational axis 310 around the stator at a constant mechanical angle 319 equal to a constant electrical angle of 120° divided by M relative to each other. In this example, M=3 so the constant mechanical angle 319 is 40°. The magnetic flux sensors are spaced directly from the magnetic rotor 306 by a radial air gap 320 (X) in such a way that the magnetic flux 314 of the magnetic rotor impinges on the analog magnetic flux sensors 316, 317 and 318 without obstruction to output two sinusoidal signals 322, 323 and 324 with phases separated by the constant electrical angle 326 that can be evaluated to determine the rotational position $\Theta_M$ 328 of the magnetic rotor.

As shown, analog magnetic flux sensors 316, 317 and 318 are positioned at one end of the hollow cylindrical stator 302 adjacent the stator windings 304. The sensors are embedded in respective pockets 330 formed in the stator. If the radial air gap 320 is sufficiently large the sensors may be surface-mounted on an interior surface of the stator. The magnetic rotor 306 is extended past the stator windings 304 to be spaced directly across from the analog magnetic flux sensors. This allows for integration of the sensors without affecting the motor design, and specifically the stator windings. The sensors are preferably positioned such that their sense axes 332 are perpendicular to the extended magnetic rotor 306 to align the sense axis to the rotor's magnetic field 314. In this implementation, the sensors are arranged in different planes perpendicular to the rotational axis. The sensors may be positioned at opposite ends of the stator windings 304 with the magnetic rotor extending past both ends of the stator windings. If the magnetic rotor 306 is not extended the sensors may be tilted to better align the sense axis 332 to the rotor's magnetic field 314.

The open ends of the hollow cylindrical stator 306 and the three analog magnetic flux sensors 316, 317 and 318 are contained within an encapsulation material 334 such as an epoxy that encapsulates stator windings 304 while allowing the rotor shaft 312 to pass through and rotate. Encapsulation allows for use in high temperature or high shock environments. Absent encapsulation the motor and position sense capability is limited to approximately 250 gs. With encapsulation the motor and position sense capability are operable above 5,000 gs up to and possibly exceeding 20,000 gs.

Sinusoidal signals 322, 323 and 324 are routed out of the PMSM 300 to an external controller (not shown) where the signals are evaluated to determine the rotational position $\Theta_M$ 328 of the magnetic sensor, which is then used as an input to determine the waveforms used to drive the stator windings to rotate the rotor shaft.

Figure 6A:
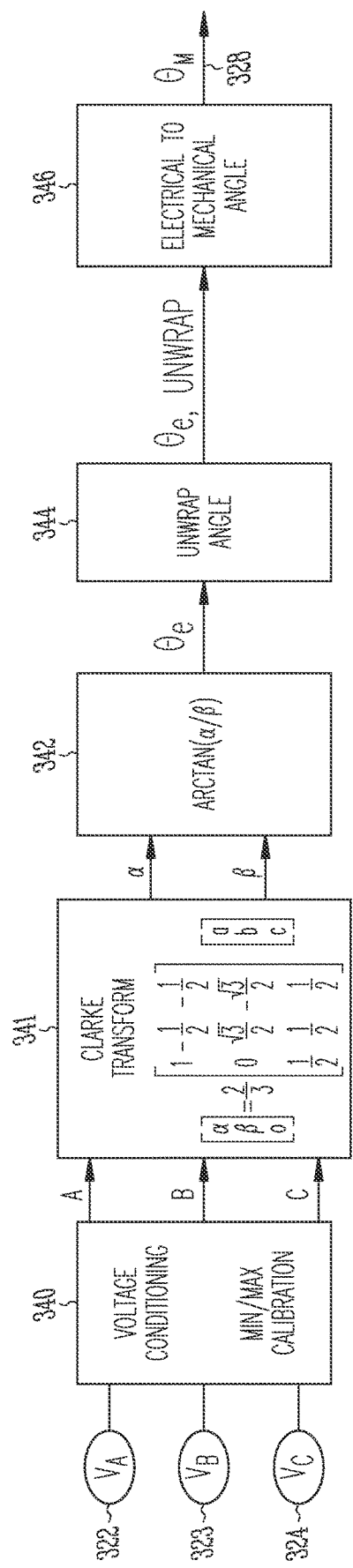
FIGS. 6A-6B are schematic illustrations of a conventional control algorithm based on a four-quadrant inverse tangent and a variant of the control algorithm using an Angle Tracking Observer (ATO), respectively, using a 3-phase to 2-phase transform to compute the rotational position of the magnetic rotor for the pair of magnetic flux sensors.

Referring now to FIG. 6A, the controller is responsive to the three sinusoidal signals 322, 323 and 324 to condition and map the signals 340 to a specified range, perform a 3-phase to 2-phase transform (e.g., a Clarke Transform) 341, compute a four-quadrant inverse tangent 342 to generate a magnetic rotor electrical angle that repeats with the number of pole pairs M, unwraps the magnetic rotor electrical angle 344 and to convert 346 the magnetic rotor electrical angle to magnetic rotor mechanical angle $\Theta_M$ 328 indicative of the rotational position of the magnetic rotor.

Figure 6B:
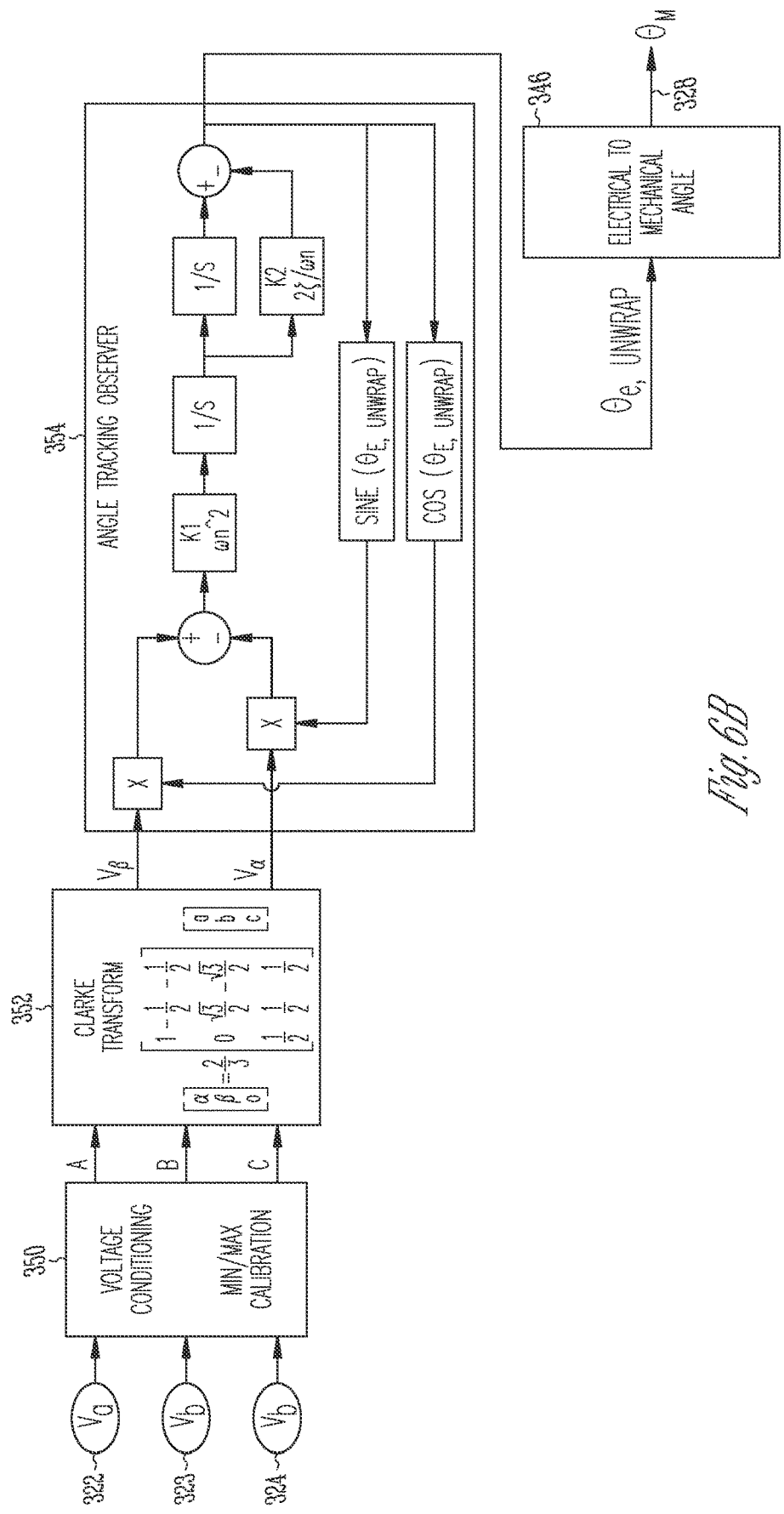

Referring now to FIG. 6B, the controller is responsive to the two sinusoidal signals 322, 323 and 324 to condition and map the signals 350 to a specified range, perform a 3-phase to 2-phase transform (e.g., a Clarke Transform) 352, and to implement an Angle Tracking Observer (ATO) 354 to generate the unwrapped rotor electrical angle and to convert 346 the unwrapped rotor electrical angle to the magnetic rotor mechanical angle $\Theta_M$ 328. The ATO is a closed-loop position estimator having tunable bandwidth and damping parameters to reduce noise in the calculated magnetic rotor mechanical angle and improve accuracy of low-speed position estimation.

Figure 7:
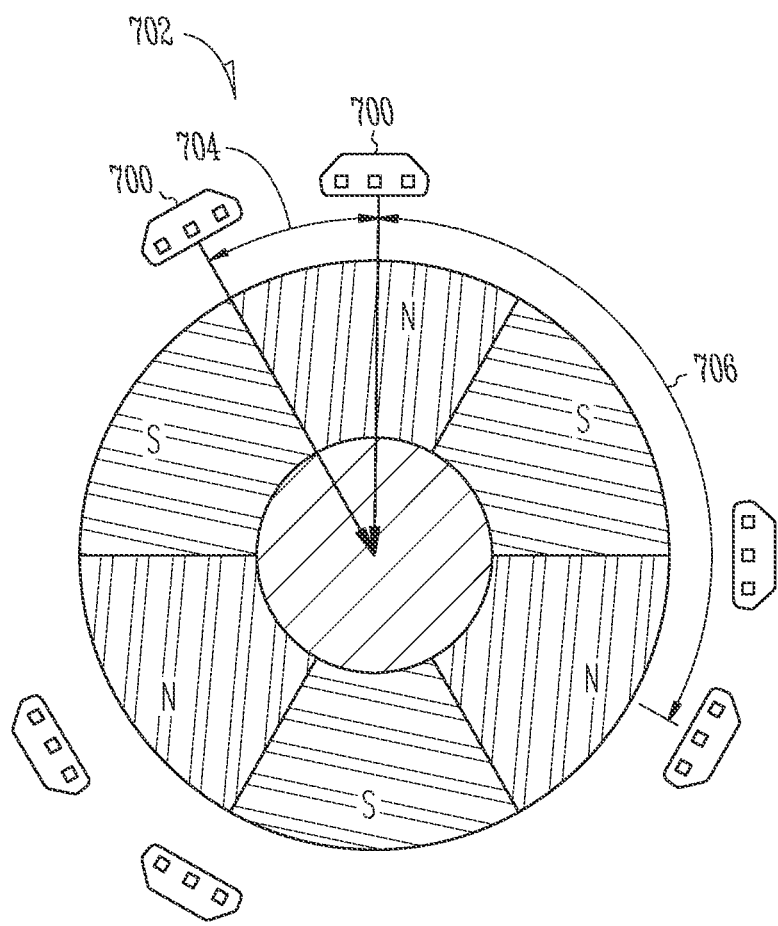
FIG. 7 is an end view illustrating L=3 pairs of sensors in which each pair is spaced at a group electrical angle 360/3=120° and the sensors in each pair are spaced at a constant mechanical angle of 30° for a constant electrical angle of 90° where the measured sinusoidal signals are averaged to compensate for different strengths of the rotor magnets.

Referring now to FIG. 7, to compensate for different strengths of rotor magnets, the 2 or 3 analog magnetic flux sensors 700 can be formed into L groups 702 so that there are L instances of each of the 2 or 3 sensors. The outputs of the L sensors are averaged together to produce the two or three sinusoids. The individual sensors are separated by the mechanical angle 704 equal to the electrical angle (dependent on 2 or 3 sensors)/M. The groupings 702 are separated by an electrical angle 706=360 mechanical degrees divided by M pole pairs. If L=1, the configuration for 2 or 3 sensors defaults to what was previously illustrated. Typically, L will range between 2 and M, anything more than M being redundant. As shown here, L=M=3 so mechanical angle 704 is 30° for 2 sensors and electrical angle 706 is 120° for 3 groupings.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A Permanent Magnet Synchronous Motor (PMSM), comprising,
a hollow cylindrical stator with stator windings,
a magnetic rotor having M pole pairs arranged to rotate around a rotational axis in the stator by a rotor shaft, wherein the stator windings can be energized to generate a magnetic rotational field in dependence upon the rotational position of the magnetic rotor,
two or more analog magnetic flux sensors positioned within the hollow cylindrical stator and arranged concentrically with respect to the rotational axis around the stator at a constant mechanical angle equal to a constant electrical angle divided by M relative to each other, wherein the magnetic flux sensors are spaced directly from the magnetic rotor by a radial gap (X) in such a way that the magnetic flux of the magnetic rotor impinges on the analog magnetic flux sensors without obstruction to output two or more sinusoidal signals with phases separated by the constant electrical angle that can be evaluated to determine the rotational position of the magnetic rotor.

2. The PMSM of claim 1, wherein an outer diameter of the hollow cylindrical stator is greater than 20 mm.

3. The PMSM of claim 1, wherein the two or more analog magnetic flux sensors are positioned at one end of the hollow cylindrical stator adjacent the stator windings, wherein the magnetic rotor extends past the stator windings to be spaced directly across from the two or more analog magnetic flux sensors.

4. The PMSM of claim 3, wherein each of the analog magnetic flux sensors has a sense axis, wherein the two or more analog magnetic flux sensors are positioned with their sense axes pointed at and perpendicular to the magnetic rotor.

5. The PMSM of claim 3, wherein the two or more analog magnetic flux sensors are arranged a single plane perpendicular to the rotational axis.

6. The PMSM of claim 3, wherein the two or more analog magnetic flux sensors are arranged in different planes perpendicular to the rotational axis.

7. The PMSM of claim 3, wherein the one end of the hollow cylindrical stator and the two or more analog magnetic flux sensors are contained within encapsulated stator windings while allowing the rotor shaft to pass through and rotate.

8. The PMSM of claim 1, wherein the two or more analog magnetic flux sensors are embedded in one or more pockets formed in the hollow cylindrical stator.

9. The PMSM of claim 1, wherein the two or more analog magnetic flux sensors are surface-mounted on an interior surface of the hollow cylindrical stator.

10. The PMSM of claim 1, wherein the motor includes two analog magnetic flux sensors positioned with an electrical angle of 90° relative to each other.

11. The PMSM of claim 10, further comprising:
a controller external to the PMSM, said controller responsive to the two sinusoidal signals to condition and map the signals to a specified range, compute a four-quadrant inverse tangent to generate a magnetic rotor electrical angle that repeats with the number of pole pairs M, unwraps the magnetic rotor electrical angle and to convert the magnetic rotor electrical angle to a magnetic rotor mechanical angle indicative of the rotational position of the magnetic rotor.

12. The PMSM of claim 10, further comprising:
a controller external to the PMSM, said controller responsive to the two sinusoidal signals to condition and map the signals to a specified range and implement an Angle Tracking Observer (ATO) to generate an unwrapped rotor electrical angle and to convert the unwrapped rotor electrical angle to a magnetic rotor mechanical angle indicative of the rotational position of the magnetic rotor.

13. The PMSM of claim 12, wherein the ATO is a closed-loop position estimator having tunable bandwidth and damping parameters to reduce noise in the calculated magnetic rotor mechanical angle and improve accuracy of low-speed position estimation.

14. The PMSM of claim 1, wherein the motor includes three analog magnetic flux sensors having an electrical angle of 120°.

15. The PMSM of claim 14, further comprising:
a controller external to the PMSM, said controller responsive to the three sinusoidal signals to condition and map the signals to a specified range, implements a 3-phase to 2-phase transform to generate two sinusoidal signals, compute a four-quadrant inverse tangent to generate a magnetic rotor electrical angle that repeats with the number of pole pairs M, unwraps the magnetic rotor electrical angle and to convert the electrical angle to a magnetic rotor mechanical angle indicative of the rotational position of the magnetic rotor.

16. The PMSM of claim 14, further comprising:
a controller external to the PMSM, said controller responsive to the three sinusoidal signals to condition and map the signals to a specified range, implements a 3-phase to 2-phase transform to generate two sinusoidal signals, and implements an Angle Tracking Observer (ATO) to generate an unwrapped rotor electrical angle and to convert the unwrapped rotor electrical angle to a magnetic rotor mechanical angle indicative of the rotational position of the magnetic motor.

17. The PMSM of claim 16, wherein the ATO is a closed-loop position estimator having tunable bandwidth and damping parameters to reduce noise in the calculated mechanical angle and improve accuracy of low-speed position estimation.

18. The PMSM of claim 1, wherein L groups of two or three analog magnetic flux sensors are spaced at a group electrical angle of 360 mechanical degrees divided by M pole pairs.

19. The PMSM of claim 18, wherein L=M.

20. A Permanent Magnet Synchronous Motor (PMSM), comprising,
a hollow cylindrical stator with encapsulated stator windings,
a magnetic rotor having M pole pairs arranged to rotate around a rotational axis in the stator by a rotor shaft, wherein the stator windings can be energized to generate a magnetic rotational field in dependence upon the rotational position of the magnetic rotor,
two or more analog magnetic flux sensors positioned within the hollow cylindrical stator and contained in the encapsulated stator windings, said sensors arranged concentrically with respect to the rotational axis around the stator at a constant mechanical angle equal to a constant electrical angle divided by M relative to each other, wherein the magnetic flux sensors are spaced directly from the magnetic rotor by a radial gap (X) in such a way that the magnetic flux of the magnetic rotor impinges on the analog magnetic flux sensors without obstruction to output two or more sinusoidal signals with phases separated by the constant electrical angle that can be evaluated by an Angle Tracking Observer (ATO) to generate an unwrapped rotor electrical angle and to convert the unwrapped rotor electrical angle to a magnetic rotor mechanical angle indicative of the rotational position of the magnetic motor, said encapsulated stator windings and analog magnetic flux sensors capable of withstanding shocks in excess of 5,000 gs.

* * * * *

UNITED STATES PATENT AND TRADEMARK OFFICE
CERTIFICATE OF CORRECTION

PATENT NO. : 12,212,257 B2
APPLICATION NO. : 18/118968
DATED : January 28, 2025
INVENTOR(S) : Walecka et al.

Page 1 of 1

It is certified that error appears in the above-identified patent and that said Letters Patent is hereby corrected as shown below:

In the Specification

In Column 4, Line 55, delete "1200" and insert --120°-- therefor

In Column 6, Line 58, delete "206" and insert --202-- therefor

In Column 8, Line 14, delete "306" and insert --302-- therefor

In the Claims

In Column 9, Line 10, in Claim 1, delete "comprising," and insert --comprising:-- therefor In Column 10, Line 55, in Claim 20, delete "comprising," and insert --comprising:-- therefor Signed and Sealed this
Thirtieth Day of December, 2025

John A. Squires
*Director of the United States Patent and Trademark Office*